US010177685B2

(12) United States Patent
Gu et al.

(10) Patent No.: US 10,177,685 B2
(45) Date of Patent: Jan. 8, 2019

(54) SWITCHING CONVERTER WITH IMPROVED POWER DENSITY

(71) Applicant: Texas Instruments Incorporated, Dallas, TX (US)

(72) Inventors: Bin Gu, Sunnyvale, CA (US); Michael Douglas Seeman, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 107 days.

(21) Appl. No.: 15/258,242

(22) Filed: Sep. 7, 2016

(65) Prior Publication Data

US 2017/0077837 A1    Mar. 16, 2017

Related U.S. Application Data

(60) Provisional application No. 62/216,432, filed on Sep. 10, 2015.

(51) Int. Cl.
*H02M 7/797*   (2006.01)
*H02M 1/15*    (2006.01)

(52) U.S. Cl.
CPC ............. *H02M 7/797* (2013.01); *H02M 1/15* (2013.01)

(58) Field of Classification Search
CPC ................................ H02M 7/797; H02M 1/15
See application file for complete search history.

(56) References Cited

U.S. PATENT DOCUMENTS 6,269,784 B1 * 8/2001 Newton .............. F01L 9/04
 123/90.11
6,424,207 B1 * 7/2002 Johnson ............. H02M 1/15
 327/552

(Continued)

FOREIGN PATENT DOCUMENTS

DE   4441214 A1   5/1996
SU    718876 A1   2/1980

OTHER PUBLICATIONS

Search Report for PCT Application No. PCT/US16/51342, dated Dec. 29, 2016 (1 page).

(Continued)

*Primary Examiner* — Adolf Berhane
*Assistant Examiner* — Bart Iliya
(74) *Attorney, Agent, or Firm* — Tuenlap D. Chan; Charles A. Brill; Frank D. Cimino

(57) ABSTRACT

Disclosed examples include switching power converters, control methods and ripple filter circuits in which first and second switches are connected in series across first and second DC bus nodes, with an inductor connected to a switching node joining the first and second switches and a storage capacitor between the inductor and the second DC bus node. A control circuit operates the switches to alternately transfer ripple energy from a DC bus capacitor of the DC bus circuit through the inductor to the storage capacitor, and then to transfer ripple energy from the storage capacitor through the inductor to the DC bus capacitor to regulate the ripple voltage of the DC bus circuit, and the control circuit provides hysteretic control of the absolute value of the inductor current between a first value and a higher second value during transfer of ripple energy between the DC bus capacitor and the storage capacitor.

15 Claims, 4 Drawing Sheets

(56) References Cited

U.S. PATENT DOCUMENTS

| | | | |
|---|---|---|---|
| 2006/0158911 A1* | 7/2006 | Lincoln | H02H 7/122 363/56.01 |
| 2007/0236971 A1* | 10/2007 | Chen | H02M 3/1588 363/56.01 |
| 2010/0027304 A1* | 2/2010 | Wang | H02M 1/15 363/126 |
| 2010/0038973 A1* | 2/2010 | Bleukx | H02M 7/5387 307/115 |
| 2011/0109271 A1* | 5/2011 | Samstad | H02J 7/0052 320/128 |
| 2011/0121798 A1* | 5/2011 | Kitanaka | H02M 3/156 323/266 |
| 2012/0249110 A1* | 10/2012 | Mohr | H02M 3/156 323/299 |
| 2013/0229844 A1* | 9/2013 | Gazit | H02M 3/158 363/123 |
| 2015/0055387 A1 | 2/2015 | Tengner et al. | |

OTHER PUBLICATIONS

Wang, et al., "A High Power Density Single-Phase PWM Rectifier With Active Ripple Energy Storage", IEEE Transactions on Power Electronics, vol. 26, No. 5, May 2011, pp. 1430-1443.

* cited by examiner

SWITCHING CONVERTER WITH IMPROVED POWER DENSITY

Under 35 U.S.C. § 119, this application claims priority to, and the benefit of, U.S. Provisional Patent Application Ser. No. 62/216,432 that was filed on Sep. 10, 2015 and is entitled "METHOD FOR INCREASING POWER DENSITY OF SINGLE-PHASE POWER CONVERTERS", the entirety of which is incorporated by reference herein.

BACKGROUND

Switching power converters include switches operated to convert electrical power from one form to another, including DC to AC converters such as switching inverters, AC to DC converters referred to as active rectifiers, DC to DC converters and AC to DC to AC converters. DC to AC and AC to DC switching converters typically include a DC bus circuit with a large bus capacitor to provide a smooth DC bus voltage. The switching operation of an active rectifier or switching inverter introduces high frequency voltage in the DC bus, as well as ripple voltage typically at twice the AC fundamental frequency (double-AC ripple) for single-phase applications. The DC bus capacitor needs to be very large in order to control the ripple voltage amplitude to deliver a smooth DC bus voltage to a DC source in an AC to DC converter or to provide a smooth DC bus voltage as an input to a switching inverter in a DC to AC converter. Conventional single-phase DC to AC converters suffer from a very low power density due to the need for large DC bus capacitance to control ripple voltage. Recent advancements in wide bandgap converter switches such as Gallium Nitride (GaN) and Silicon Carbide (SiC) devices have led to moderate server power supply power density improvements. The high frequency operation of GaN and SiC devices can reduce the size of passive AC filter inductors and capacitors in single-phase converters with respect to switching frequency noise. However, the sizing requirements of the DC bus capacitor which buffers double ac frequency energy is independent of the converter switching frequency and remains a significant barrier to increased power density in single-phase converters. Electrolytic capacitors have been employed to provide ripple voltage attenuation in the DC bus, but these electrolytic capacitors suffer from higher failure rate and shorter service life compared with other capacitor types. A need remains for reduced DC bus capacitance to improve power density in switching converters.

SUMMARY

The present disclosure provides solutions to reduce the DC bus capacitance and reduce the DC side double-AC ripple while significantly increasing the power density of single-phase power converters, and can avoid the use of failure-prone electrolytic capacitors, as well as reduce the DC side double-ac ripple. Disclosed examples include switching power converters, control methods and ripple filter circuits in which first and second switches are connected in series across first and second DC bus nodes, with an inductor connected to a switching node joining the first and second switches and a storage capacitor between the inductor and one of the DC bus nodes. A control circuit operates the switches to alternately transfer ripple energy from a DC bus capacitor through the inductor to the storage capacitor, and then to transfer ripple energy from the storage capacitor through the inductor to the DC bus capacitor to regulate the ripple voltage of the DC bus circuit. In some examples, the control circuit provides hysteretic control of the absolute value of the inductor current between a first value and a higher second value during transfer of ripple energy between the DC bus capacitor and the storage capacitor.

DETAILED DESCRIPTION

Figure 1:
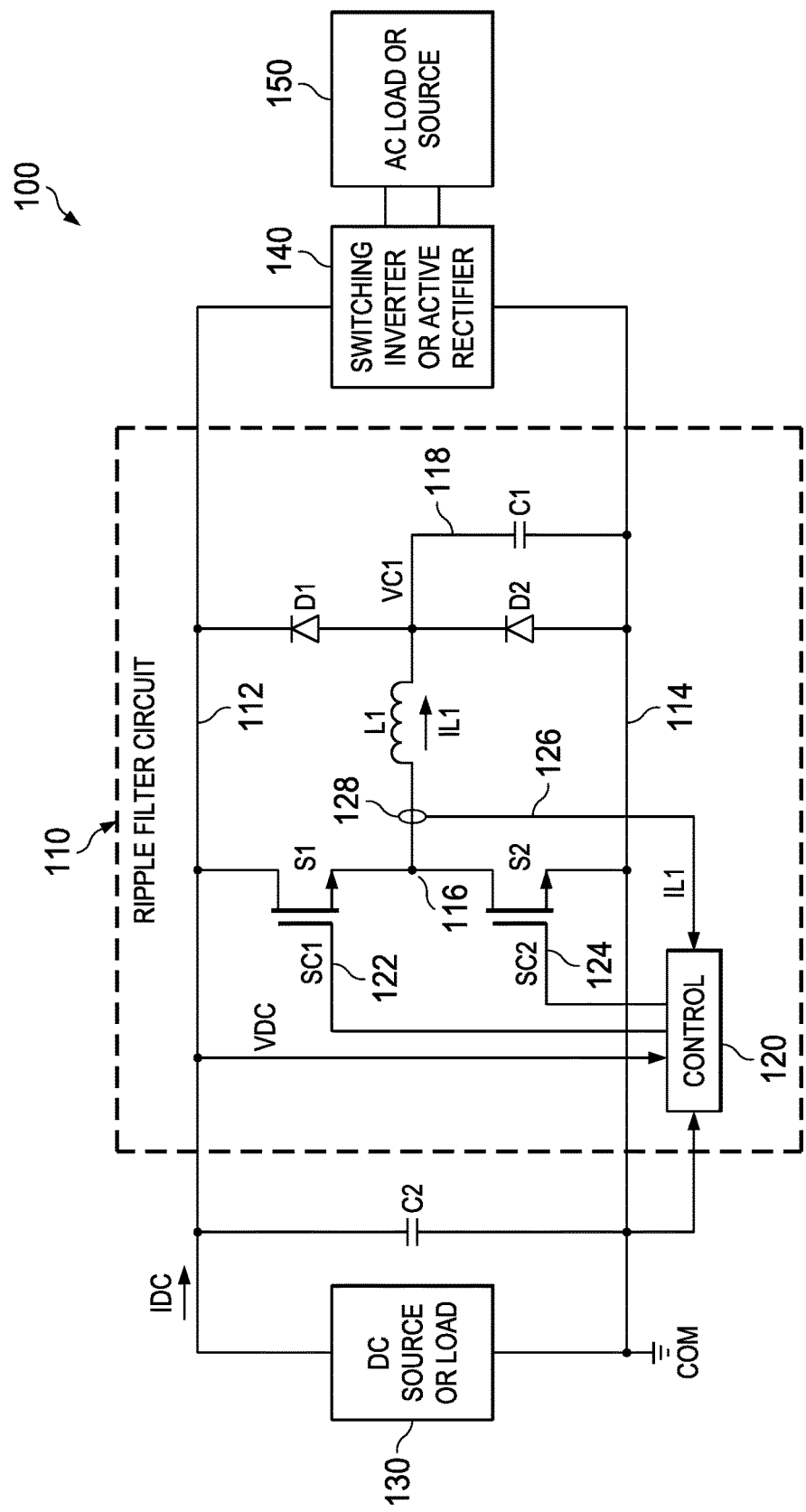
FIG. 1 is a schematic diagram of a switching power converter with a ripple filter circuit including two switches, an inductor, a storage capacitor, clamping diodes and a control circuit to control DC bus ripple voltage.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the terms "couple", "couples" or "coupled" are intended to include indirect or direct electrical or mechanical connection or combinations thereof. For example, if a first device couples to or is coupled with a second device, that connection may be through a direct electrical connection, or through an indirect electrical connection via one or more intervening devices and connections.

Switching converters previously suffered from poor power density, for example about 5 W/inch$^3$ for single phase DC to AC converters, and many server power supplies have a power density of only 25 W/in$^3$. In order to improve power density of DC to AC or AC to DC converters, the present disclosure provides ripple filter circuitry and control methods for regulating or controlling ripple voltages in a DC bus circuit. Disclosed examples selectively store or transfer ripple energy from a DC bus capacitor to a storage capacitor and then transfer ripple energy from the storage capacitor to the DC bus capacitor in a controlled fashion. Certain examples include ripple filter switching control circuitry providing hysteretic control of ripple filter inductor current between a first value and a second higher value during transfer of ripple energy between the DC bus capacitor and the storage capacitor. Examples also provide diode connections to conduct current from the storage capacitor to the DC bus when the storage capacitor voltage exceeds the DC bus voltage, as well as a second diode to conduct current from the storage capacitor when the storage capacitor voltage is negative. In this manner, disclosed examples mitigate or avoid potential overvoltage stress on the storage capacitor of the ripple filter circuit.

Certain concepts of the present disclosure provide advantages over other ripple port methods that require complex closed loop control and parameter estimation, and can facilitate full use of the storage capacitor. In addition, certain control circuit examples utilize DC bus voltage feedback signaling that is also available for normal switching converter closed loop operation, along with a signal representing the current flowing through the ripple filter inductor without requiring sensing of switch current in the associated parasitic inductance increase in the phase leg. Certain disclosed examples also avoid current stresses associated with discontinuous current mode or discontinuous conduction mode (DCM) operation associated with other ripple port approaches. Disclosed examples advantageously facilitate reduction or minimization of DC capacitance in a given switching power converter design, which leads to potentially large increases in power density. Moreover, the disclosed concepts allow the use of non-electrolytic capacitors to provide a DC bus capacitance while enhancing power density, thereby avoiding the failure issues associated with electrolytic capacitors. Furthermore, the disclosed examples divide DC side double-AC ripple regulation or control to facilitate provision of a smooth DC bus voltage for use in driving a DC load (e.g., for AC to DC converter applications) or for providing a smooth DC input to a switching inverter to drive an AC load in DC to AC converter applications.

Figure 3:
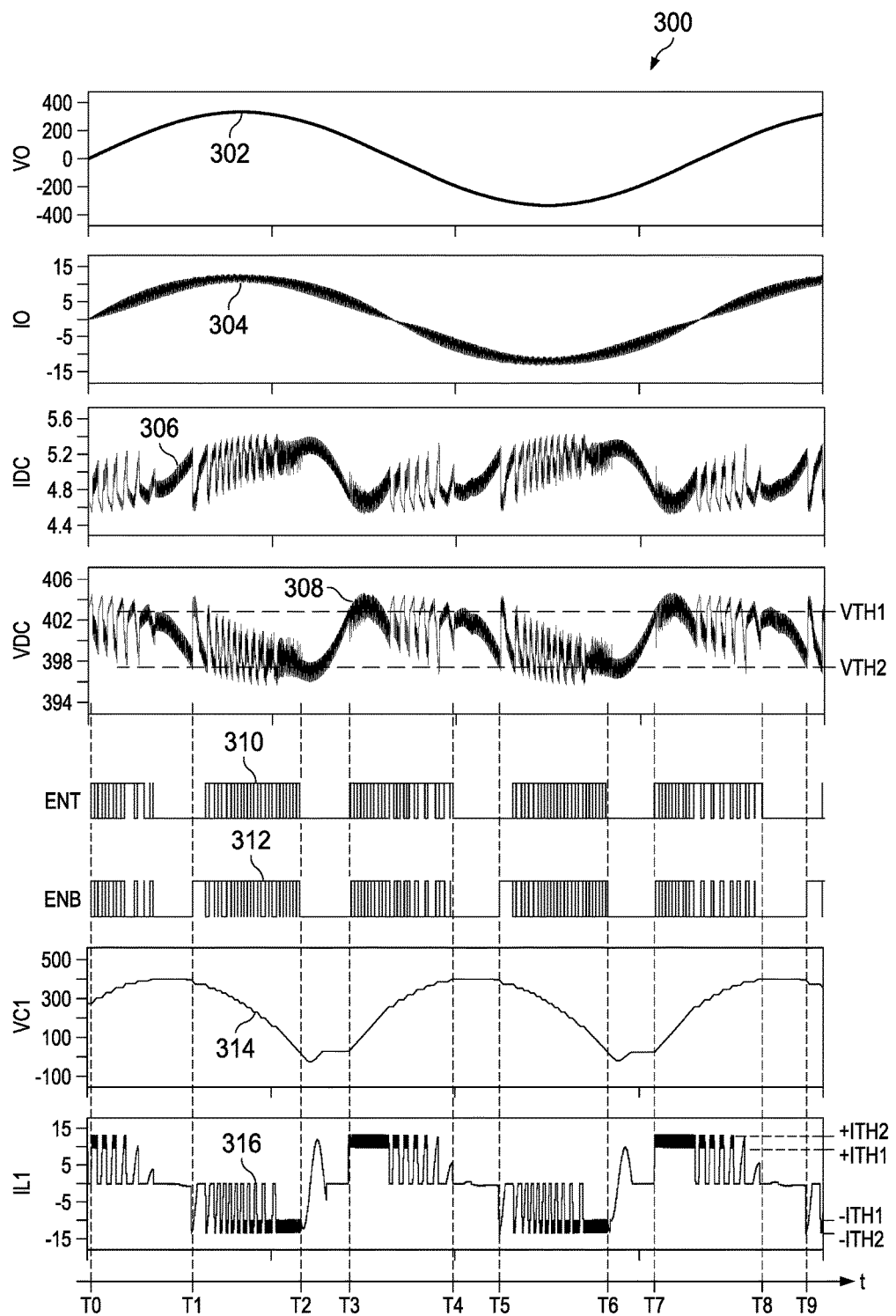
FIG. 3 is a waveform diagram showing various signals in the converter of FIG. 1.
Figure 4:
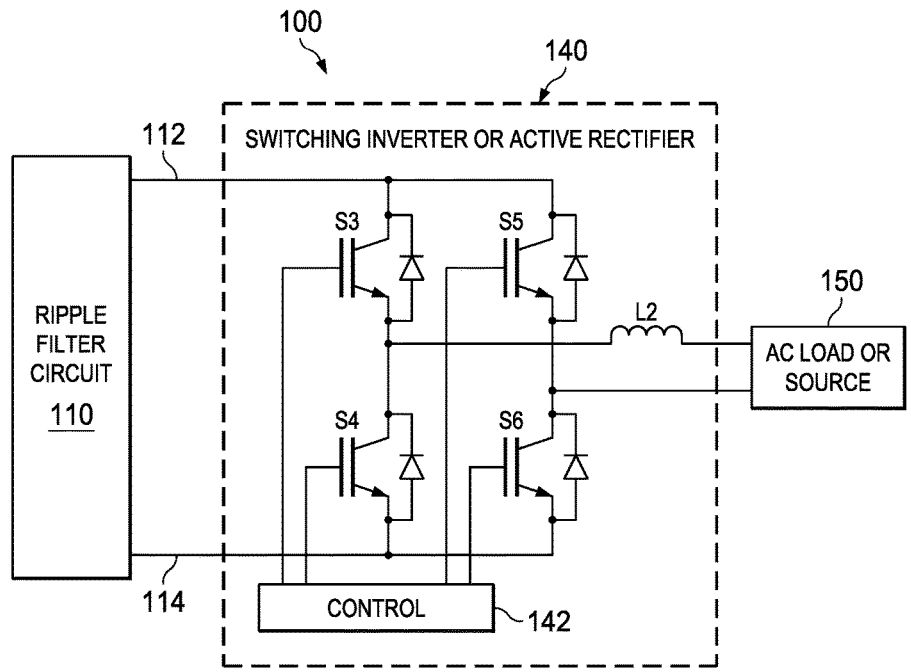
FIG. 4 is a schematic diagram of an example full H-bridge switching inverter or active rectifier circuit in the converter of FIG. 1.

FIG. 1 illustrates a switching power converter 100, which can be an AC to DC converter or a DC to AC converter in different applications. The power converter 100 includes a DC bus circuit with a first (e.g., positive) DC bus node 112 and a second DC bus node 114. In one example, the second DC bus node 114 is a system common connection COM, which can be a ground connection or other reference voltage. The DC bus circuit also includes a DC bus capacitor C2 connected between the first and second DC bus node 112 and 114. In one example, the DC bus circuit is designed for a specific range of DC bus voltages, such as approximately 400 V DC. The concepts of the present disclosure can be used in association with switching power converter systems having any nominal or expected DC bus voltage level, and are not limited to the disclosed examples. In one example, the DC bus terminals 112 and 114 are coupled to receive DC input power from a DC source 130 (e.g., DC to AC converters). In other examples, the DC bus is connected to drive a DC load 130 (e.g., AC to DC converters). The DC bus nodes 112 and 114 are also connected to a switching circuit 140 that includes switching devices to interface the DC bus circuit with an AC load or AC source 150. FIGS. 3 and 4 illustrate two non-limiting examples of switching circuits 140 that can be used. In operation, a DC source 130 or an active rectifier 140 provides a DC bus voltage between the DC bus nodes 112 and 114. In the disclosed examples, the DC bus voltage is positive at the first DC bus node 112 relative to the second DC bus node 114.

The switching power converter 100 also includes a ripple filter circuit 110 connected to the DC bus nodes 112 and 114. In operation, the ripple filter circuit 110 stores ripple energy from the DC bus circuit using a storage capacitor C1, a half bridge switching circuit leg formed by first and second switches S1 and S2, and an inductor L1. The switches S1 and S2 are operated by a control circuit 120 according to one or more feedback signals, for example, a voltage sensor signal VDC representing the DC bus voltage between the DC bus nodes 112 and 114, and an inductor current signal representing the current IL1 flowing in the inductor L1. The ripple filter circuit 110 in one example includes a current sensor 128 coupled in series with the inductor L1 in order to measure the inductor current IL1. Any suitable current sensor can be used, including an inductive sensor, a sense resistor providing a voltage signal, etc. The sensor 128 has an output 126 to provide the signal IL1 to the control circuit 120. The first (upper) switch S1 selectively connects the capacitor to the first DC bus node 112 via the inductor L1 to charge the capacitor C1 using current IL1 flowing in the direction indicated in FIG. 1, which transfers ripple energy from the DC bus circuit to the storage capacitor C1. The second (lower) switch S2 operates to selectively connect the upper terminal of the storage capacitor C1 to the second DC bus node 114 in order to discharge the capacitor C1 through the inductor L1, which transfers energy from the storage capacitor C1 back to the DC bus circuit.

The first switch S1 includes a first (upper) terminal connected to the first DC bus node 112, and a second terminal connected to a switching node 116. A first control terminal 122 of the switch S1 is coupled to receive a first switching control signal SC1 from the control circuit 120. The second switch S2 includes a first terminal connected to the switching node 116, a second terminal connected to a second DC bus node 114, and a second control terminal 124 coupled to receive a second switching control signal SC2 from the control circuit 120. The first and second switches S1 and S2 form a half bridge switching leg between the DC bus nodes 112 and 114, with the switching node 116 joining the switches S1 and S2. The inductor L1 includes a first terminal connected to the switching node 116 and a second terminal connected to a second node 118. The storage capacitor C1 includes a first (upper) terminal connected to the second node 118 and a second (lower) terminal connected to the second DC bus node 114. In other non-limiting examples, the second terminal of the storage capacitor C1 is connected to the first DC bus node 112.

The control circuit 120 operates the switches S1 and S2 by providing the switching control signals SC1 and SC2 to the control terminals 122 and 124, respectively, in order to alternately transfer ripple energy from the DC bus capacitor C2 through the inductor L1 for storage in the storage capacitor C1, and then to transfer ripple energy from the storage capacitor C1 to the DC bus capacitor C2 to regulate the ripple voltage of the DC bus circuit. This operation controls a voltage signal VC1 representing the voltage across the storage capacitor C1 as indicated in FIG. 1. The alternating storage (e.g., charging) and discharging of the storage capacitor C1 controls or regulates the amount of ripple voltage of the DC bus circuit. This, in turn, relaxes the amount of capacitance needed for the DC bus capacitor C2. The lower capacitance requirement mitigates the need for electrolytic DC bus capacitors, and advantageously allows potentially significant increase in the power density of the switching power converter 100. In certain examples, the DC bus capacitor C2 is non-electrolytic. Moreover, although C1 and C2 are illustrated as single capacitor components, the DC bus capacitor C2 and/or the storage capacitor C1 can also be two or more capacitor components connected in any suitable series and/or parallel configuration.

The ripple filter circuit 110 also includes a first diode D1 with an anode connected to the second node 118 and a cathode connected to the first DC bus node 112. In operation, the diode D1 conducts current from the storage capacitor C1 to the DC bus capacitor C2 when the positive voltage VC1 across the storage capacitor C1 exceeds the DC bus voltage VDC between the first and second DC bus nodes 112 and 114. The ripple filter circuit 110 includes a second diode D2 with an anode connected to the second DC bus node 114 and a cathode connected to the second node 118. The diode D2 conducts current from the second terminal of the storage capacitor C1 when the voltage VC1 across the storage capacitor C1 is negative. In this manner, the ripple filter circuit 120 can advantageously utilize all or a large portion of the storage capacity of the storage capacitor C1 (e.g., to temporarily store voltages VC1 close to the DC bus voltage VDC), with the diodes D1 and D2 mitigating or preventing overvoltage stress on the storage capacitor C1.

Figure 2:
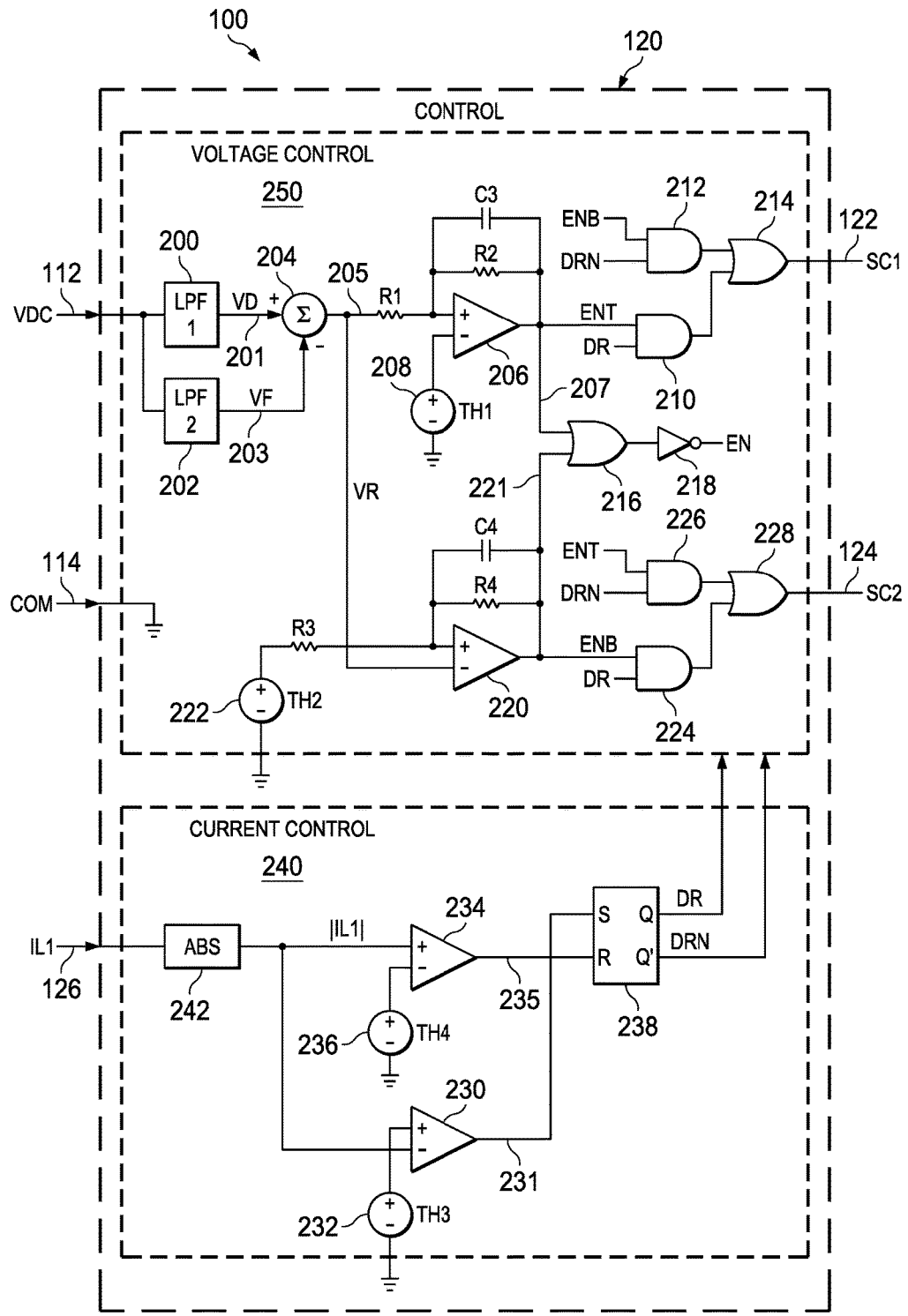
FIG. 2 is a schematic diagram of an example control circuit providing a hysteretic current control loop circuit and a voltage control loop to operate the ripple filter circuit switches to regulate ripple voltage in the converter of FIG. 1.

FIG. 2 shows an example control circuit 120 providing a hysteretic current control circuit 240 and a voltage control circuit 250. The circuit 120 implements voltage and current control loops to operate the ripple filter circuit switches S1 and S2 and regulate ripple voltage and control the inductor current IL1 in the converter of FIG. 1. In this example, the voltage control circuit 250 includes a filter circuit illustrated as first and second low pass filter circuits 200 and 202, and a summing circuit 204. The filter circuitry 200, 202, 204 filters a first signal VDC that represents the DC bus voltage VDC at the first DC bus node 112 to provide a second signal VR representing a ripple voltage of the DC bus circuit. In this example, the first low pass filter circuit 200 (LPF1 in the drawing) has a cutoff frequency of 5 to 10 kHz to remove higher frequency switching noise components and provides a first filter output signal VD at an output 201. The second low pass filter circuit 202 has a cutoff frequency below the fundamental AC frequency of the AC load or source 150, for example, about 10 Hz. The second filter circuit 202 has an output 203 that provides a second filter signal VF representing the DC voltage of the DC bus circuit. The summing circuit 204 subtracts the VF signal from the VD signal to provide the second signal VR at an output node 205. The signal VR represents the ripple voltage of the DC bus circuit.

The voltage control circuit 250 in FIG. 2 includes two comparator circuits, two reference circuits, logic gates and a driver circuit to implement a voltage control loop to regulate the ripple voltage of the DC bus circuit according to the VR signal. A first comparator 206 has a non-inverting input (+) connected through a first resistor R1 to the summing circuit output node 205 to receive the signal VR. A parallel combination of a second resistor R2 and a capacitor C3 is connected between the non-inverting input and an output 207 of the comparator 206. The first comparator output 207 provides a top side switch enable signal ENT. An inverting input (−) of the comparator 206 is connected to a first voltage reference 208 that provides a reference voltage TH1 used as a first threshold. The comparator 206 provides the enable signal ENT at a first (e.g., high) state or level when the ripple voltage signal VR exceeds the first threshold TH1. A second comparator 220 includes an inverting input connected to the summing circuit output node 205 to receive the VR signal. A non-inverting input of the second comparator 220 is connected through a resistor R3 to receive a second threshold voltage TH2 from a second voltage reference 220. A parallel feedback circuit formed by a resistor R4 and a capacitor C4 is connected between the non-inverting input and an output 221 of the second comparator 220 to provide a bottom side enable signal ENB. The comparator 220 asserts the bottom side enable signal ENB (active high) when the ripple voltage signal VR is less than the second threshold voltage TH2.

Referring to FIGS. 1 and 2, the voltage control circuit 250 includes driver circuitry and logic gates that provide the switching control signal SC1 to the control terminal 122 of the first switch S1 and provide the second switching control signal SC2 to the control terminal 124 of the second switch S2. The voltage control circuit 250 receives first and second drive enable signals DR and DRN from the current control circuit 240 to facilitate hysteretic current control of the inductor current IL1 in the ripple filter circuit 110. The top side switch enable signal ENT is provided as an input to an AND gate 210. A second input of the AND gate 210 receives the DR signal from the current control circuit 240. The output of the AND gate 210 provides an input to an OR gate 214. The output of the OR gate is connected to the control terminal 122 of the upper first switch S1 of the ripple filter circuit 110. In the example of FIG. 1, the switches S1 and S2 are NMOS transistors. Other implementations are possible using different types of transistors (e.g., bipolar, IGBTs, etc.). In addition, other examples can be made using PMOS transistors or combinations of NMOS and PMOS transistors, in which case the logic of the driver circuitry in the voltage control circuit 250 is modified to provide active low switching control signals SC1 and/or SC2.

In the example of FIG. 2, the AND gate 210 provides a logic high output signal to the OR gate 214 to selectively provide the first switching control signal SC1 when the ENT and DR signals are both high. This indicates that the current control circuit 240 has selected normal polarity to address positive ripple voltages, and the first comparator 206 of the voltage control circuit 250 has detected the second signal VR exceeding the first threshold TH1. The output 221 of the second comparator 220 provides the bottom side enable signal ENB as an input to an AND gate 224, and the second input of the AND gate 224 receives the drive enable signal DR from the current control circuit 240. The output of the AND gate 224 is connected as an input to a second OR gate 228. An output 124 of the OR gate 228 provides the second switching control signal SC2 to control operation of the second switch S2 of the ripple filter circuit 110. The other input of the OR gate 228 is provided by another AND gate 226 which receives the ENT and DR N signals as inputs. The voltage control circuit 250 in one example further includes another OR gate 216 with inputs connected to the comparator outputs 207 and 221. The OR gate 216 provides a signal to an inverter 218 which generates an enable signal EN. The enable signal EN is active low when either the ENT or ENB signals are high, and can be used by a host system to control operation of the switching circuit 140 or for other control purposes within the switching converter system 100. In other examples, all or portions of the logic of the current and voltage control circuits 240, 250 can be implemented in programmable or programmed devices such as a microcontroller or computer via firmware and/or software program code or instructions.

In one example, the first threshold TH1 represents a first ripple voltage threshold VTH1 (FIG. 3) approximately 3 V above the nominal DC bus voltage. For example, if the DC bus has a voltage of 400 V DC between the first and second DC bus terminals 112 and 114, the detector 206 asserts the ENT signal (active high) when the voltage of the first DC bus terminal 112 is approximately 403 V above the voltage of the second DC bus terminal 114. A second AND gate 212 provides a second input to the OR gate 214 to selectively enable the first switching control signal SC1. The AND gate 212 has inputs to receive the inverse driver enable signal DRN from the current control circuit 240 and the ENB signal from the second comparator 220. The ENB signal is asserted (active high) by the second comparator 220 when the ripple voltage signal VR is below the second threshold voltage TH2. For example, the voltage reference 222 provides the second threshold voltage TH2 at a level that represents a second ripple voltage threshold VTH2 (FIG. 3) approximately 3 V below the nominal DC bus voltage. The first and second thresholds TH1 and TH2 allow the voltage control circuit 250 to effectively regulate the DC bus circuit ripple voltage within a range (e.g., 397 V through 403 V) that provides a manageable capacitance requirement for the DC bus capacitor C2. This, in turn, facilitates use of a non-electrolytic capacitor C2, and potentially significant reduction in the overall physical size of the DC bus capacitor C2 to yield improvements in power density for the switching power converter 100.

The OR gate 214 selectively enables the first switching control signal SC1 to control the first switch S1 according to the first threshold TH1 or the second threshold TH2 depending on the driver enable signals DR and DRN from the current control circuit 240, as well as according to the ENT and ENB signals based on the voltage threshold comparisons. The OR gate 228 selectively enables the second switching control signal SC2 in order to control the second switch S2 according to other of the thresholds TH1 and TH2 based on the DR and DRN signals. In the illustrated example, the driver circuitry and logic of the voltage control circuit 250 selectively enables one of the switching control signals SC1 or SC2 in response to the signal VR exceeding the first threshold TH1, and selectively enables the other of the first and second switching control signals SC1, SC2 in response to the signal VR falling below the second threshold TH2 to regulate a ripple voltage of the DC bus circuit. As illustrated and described further below in connection with FIG. 3, the voltage control circuit 250 controls the ripple voltage of the DC bus circuit by selectively providing the first and second switching control signals SC1 and SC2 to selectively transfer ripple energy from the DC bus capacitor C2 to the storage capacitor C1 in response to the DC bus voltage VDC exceeding the upper threshold VTH1. The voltage control circuit 250 also controls the signals SC1 and SC2 to selectively transfer ripple energy from the storage capacitor C1 to the DC bus capacitor C2 in response to the DC bus voltage VDC falling below the lower threshold VTH2.

As further shown in FIG. 2, the current control circuit 240 implements a current control loop. The current control circuit 240 selectively provides the drive enable signals DR and DRN to the voltage control circuit 250 to selectively enable the first switching control signal SC1 or the second switching control signal SC2 at any given time according to a signal |IL1| representing the absolute value of an inductor current IL1 flowing in the inductor L1. The current control circuit 240 provides hysteretic control of the absolute value of the inductor current IL1 between a first value ITH1 and a higher second value ITH2 during transfer of ripple energy between the DC bus capacitor C2 and the storage capacitor C1. In this example, the normal drive signal DR is provided to the voltage control circuit 250 from a Q output of an S-R flip-flop 238, and the inverse drive signal DRN is provided by the Q' output of the flip-flop 238.

The current control circuit 240 includes an absolute value circuit 242 that receives the inductor current sensor signal IL1 and provides the absolute current value signal |IL1|. Any suitable absolute value circuit 242 can be used, such as a rectifier in one example. The signal |IL1| is provided to an inverting input of a third comparator 230 for comparison with a third threshold TH3 from a third voltage reference 232. The voltage reference 232 sets the threshold TH3 corresponding to a first current level ITH1 in FIG. 3 (e.g., 10 A). An output 231 of the comparator 230 provides a set (S) input to a flip-flop 238. When the absolute current value signal |IL1| falls below the threshold TH3, the flip flop 238 sets the DR signal high to enable the AND gates 210 and 224 of the voltage control circuit 250. In this state, the first switching control signal SC1 is enabled (S1 can turn on) when the comparator 206 asserts the signal ENT by the ripple voltage signal VR exceeding the threshold TH1. Also in this state, the second switching control signal SC2 is enabled (S2 can turn on) when the comparator 220 asserts the signal ENB by the ripple voltage signal VR falling below the threshold TH2.

The current control circuit 240 also includes another comparator 234 that receives the signal |IL1| at a non-inverting input, and receives a fourth threshold TH4 at an inverting input from a fourth voltage reference 236. An output 235 of the comparator 234 provides a reset (R) input to the flip-flop 238. The voltage reference 236 sets the threshold TH4 corresponding to a second higher current level ITH2 in FIG. 3 (e.g., 13 A). When the absolute current value signal |IL1| exceeds the threshold TH4, the flip flop 238 sets the DRN signal high to enable the AND gates 212 and 226 of the voltage control circuit 250. In this state, the first switching control signal SC1 is enabled (S1 can turn on) when the comparator 220 asserts the signal ENB by the ripple voltage signal VR falling below the threshold TH2. Also in this state, the second switching control signal SC2 is enabled (S2 can turn on) when the comparator 206 asserts the signal ENT by the ripple voltage signal VR exceeding the threshold TH1.

The control circuit 120 implements dual loop control to regulate ripple voltage, allowing the use of a lower capacitance, non-electrolytic capacitor C2 in the DC bus circuit. The voltage control circuit 250 implements a voltage control loop to regulate the ripple voltage of the DC bus circuit in a range defined by the voltage references 208 and 222 (corresponding to the voltage thresholds VTH1 and VTH2 in FIG. 3) to transfer ripple energy from the DC bus capacitor C2 to the storage capacitor C1 to reduce the ripple level, and then to transfer ripple energy from the storage capacitor C1 back to the DC bus capacitor C2 to prop up the DC bus voltage in alternating fashion. During the alternate charging and discharging of the storage capacitor C1 by the voltage control circuit 250, the current control circuit 240 implements a current control loop with hysteresis to control the absolute value of the inductor current IL1 between the first value ITH1 and the higher second value ITH2. This hysteretic current control mitigates stress to the ripple filter inductor L1. In addition, the diodes D1 and D2 in FIG. 1 inhibit overvoltage stress to the storage capacitor C1 to prevent negative or excessive positive capacitor voltages. These advantages of the ripple filter circuit 110, in turn, facilitate significant space savings, particularly in reducing the physical size and capacitance of the DC bus capacitor C2, thereby enhancing the switching power converter power density.

FIG. 3 shows a waveform diagram 300 that illustrates various signals in the ripple filter circuit 110 and the converter 100 of FIGS. 1 and 2 for the case of a DC to AC converter implementation during steady state operation of the switching inverter 140. In this example, an AC output voltage curve 302 and an AC output current curve 304 illustrate the generally sinusoidal output of a switching inverter 140 to drive an AC load 150. The DC bus circuit provides DC input power to the inverter 140. Switching action of the inverter 140 creates ripple voltage in the DC bus voltage VDC, shown as curve 308. The ripple filter circuit 110 operates generally independent of the inverter switching according to the sensed VDC and IL1 signals. The ripple filter circuit 110 is similar for AC to DC converter implementations in which the switching circuit 140 is an active rectifier creating ripple voltages in the DC bus circuit.

FIG. 3 shows the top side enable signal ENT as curve 310, and the bottom side enable signal ENB is shown as curve 312. The voltage control circuit 150 selectively enables actuation of the switches S1 and S2 when the DC bus voltage VDC transitions outside the voltage control thresholds VTH1 and VTH2. For transitions above the upper threshold VTH1 (e.g., above 403 V), the circuit 110 transfers energy from the DC bus circuit to charge the storage capacitor C1, shown as rising portions of the storage capacitor voltage curve 312 (VC1 in FIG. 1). When VDC transitions below the lower threshold VTH2 (e.g., below 397 V) the switches S1 and S2 are operated to transfer energy from the storage capacitor C1 to the DC bus capacitor C2, shown as decreasing portions of the VC1 curve 314. The DC bus current curve 306 (IDC in FIG. 1) undergoes transitions in response to turning S1 and S2 on and off.

Curve 316 in FIG. 3 shows the ripple filter circuit inductor current IL1 flowing through the inductor L1. In this example, positive current flows from the switching node 118 through the inductor L1 to charge the storage capacitor C1. This decreases the bus voltage VDC, shown as decreases in the curve 308 between T0 and T1, between T3 and T4, and again between T7 and T8. The voltage control circuit 250 transfers energy from the storage capacitor C1 back to the DC bus capacitor C2 by operating the switches S1 and S2 to conduct negative current IL1. This causes a decrease in the storage capacitor voltage VC1 (curve 314) and increases the DC bus voltage VDC (curve 308), shown between T1 and T2, between T5 and T6, and again after T9 in FIG. 3. During intervening periods when VDC is in the regulation range between the thresholds VTH1 and VTH2, the voltage control circuit 250 disables the switching control signals SC1 and SC2, seen in FIG. 3 between T2 and T3, between T4 and T5, between T6 and T7, and again between T8 and T9.

The current control circuit 240 provides the DR and DRN signals from the flip-flop 238 to selectively control enablement of the switching control signals SC1 and SC2 to regulate the inductor current IL1 within a positive threshold range +ITH1 to +ITH2 to charge C1 or within a negative threshold range from −ITH1 to −ITH2 to discharge C1. In the illustrated example, ITH1 is 10 A and ITH2 is 13 A. In the illustrated example, the current control circuit 240 enables SC1 to conduct current as the current IL1 increases from +10 A to +13 A, and then reverses the signals DR and DRN to enable SC2 to conduct positive current through S2 to decrease the inductor current from +13 A to +10 A (e.g., between T0 and T1, between T3 and T4, and again between T7 and T8 in FIG. 3). For negative current regulation between T1 and T2, between T5 and T6, and again after T9 in FIG. 3, the current control circuit 240 enables SC2 to conduct current as the negative current IL1 increases from −10 A to −13 A, and then reverses the signals DR and DRN to enable SC1 to conduct negative current through S1 to decrease the inductor current from −13 A to −10 A. Other current regulation ranges can be used, and the positive and negative ranges can be the same as shown, or can be different in other examples. Controlling the inductor current IL1 facilitates minimizing the size of the inductor, and thus further helps increasing converter power density.

Figure 5:
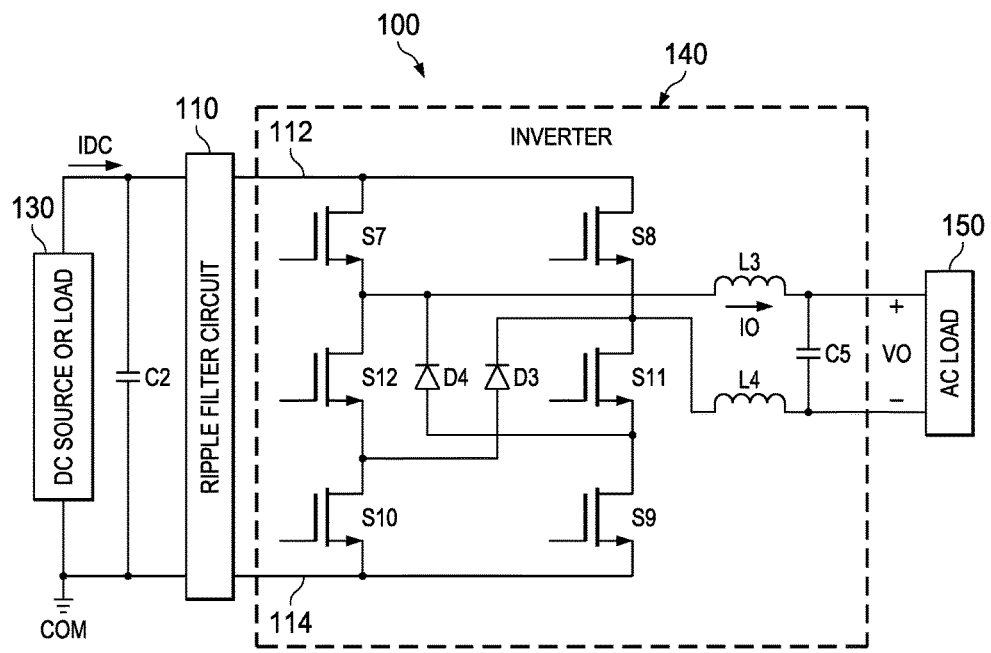
FIG. 5 is a schematic diagram of an example DC to AC switching power converter including a ripple filter circuit and a six-device switching inverter.

Referring now to FIGS. 4 and 5, the disclosed ripple filter circuits 110 can be used in combination with a variety of different switching circuits 140. There are numerous other inverter/rectifier circuits that could be used, and the present disclosure is not limited to the illustrated examples. FIG. 4 shows an example full H-bridge switching inverter or active rectifier circuit 140 that can be used in the converter of FIG. 1 to interface the DC bus circuit with a single phase AC load or AC source 150. The switching circuit 140 in this case includes switching devices S3 and S4 forming a half-bridge switching circuit leg connected between the DC bus nodes 112 and 114, with a switching node connected through an output inductor L2 to a first AC connection of the AC source or AC load 150. The other AC terminal is connected to a switching node that joins switching devices S5 and S6 in a second half-bridge switching leg circuit. FIG. 5 shows an example six-device switching inverter circuit 140 in a single phase DC to AC switching power converter, as well as a ripple filter circuit 110 as described above. The switching circuit 140 in this example is a switching inverter to convert power from the DC bus circuit to drive an AC load 150 using power converted from the output of a DC source. This example inverter 140 includes six switching devices S7-S12, with S7, S12 and S10 connected in a first leg circuit, and with S8, S9 and S11 connected in a second leg circuit between the DC bus nodes 112 and 114. Each leg circuit has an upper switching node connected through a corresponding output inductor L3 or L4 to the AC load 150, and a lower switching node connected to the other upper switching node by a corresponding diode D3 or D4. The example inverter 140 in FIG. 5 also includes an output filter capacitor C5.

Further aspects of the present disclosure provide methods for controlling ripple voltage in a DC bus circuit of a switching power converter. The method in one example includes connecting first and second switches in series with one another between first and second DC bus nodes of the DC bus circuit, connecting a first terminal of an inductor to a switching node joining the first and second switches, connecting a storage capacitor between a second terminal of the inductor and one of the DC bus nodes, and controlling the switches to alternately transfer ripple energy from a DC bus capacitor of the DC bus circuit through the inductor to the storage capacitor, and then transfer ripple energy from the storage capacitor through the inductor to the DC bus capacitor to regulate the ripple voltage of the DC bus circuit. The method further includes selectively enabling operation of the first and second switches according to a signal representing an absolute value of an inductor current flowing in the inductor to provide hysteretic control of the absolute value of the inductor current between a first value and a higher second value during transfer of ripple energy between the DC bus capacitor and the storage capacitor. In certain examples, the method further includes filtering a first signal representing a DC bus voltage of the DC bus circuit to provide a second signal representing a ripple voltage of the DC bus circuit, and selectively operating one of the first and second switches in response to the second signal exceeding a first threshold, and selectively operating the other of the first and second switches in response to the second signal falling below a second threshold to regulate the ripple voltage of the DC bus circuit.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. A ripple filter circuit for storing ripple energy from a DC bus circuit in a switching power converter, the ripple filter circuit comprising:
 a first switch, including a first terminal connected to a first DC bus node, a second terminal connected to a switching node, and a first control terminal coupled to receive a first switching control signal;
a second switch, including a first terminal connected to the switching node, a second terminal connected to a second DC bus node, and a second control terminal coupled to receive a second switching control signal;
an inductor including a first terminal connected to the switching node and a second terminal connected to a second node;
a storage capacitor including a first terminal connected to the second node and a second terminal connected to one of the first and second DC bus nodes;
a first diode including an anode connected to the second node and a cathode connected to the first DC bus node to conduct current from the storage capacitor to a DC bus capacitor of the DC bus circuit when a positive voltage across the storage capacitor exceeds a DC bus voltage between the first and second DC bus nodes;
a second diode including an anode connected to the second DC bus node and a cathode connected to the second node to conduct current from the second terminal of the storage capacitor when the voltage across the storage capacitor is negative; and
a control circuit to provide the first switching control signal to the first control terminal and to provide the second switching control signal to the second control terminal to operate the first and second switches to alternately transfer ripple energy from the DC bus capacitor to the storage capacitor and then transfer ripple energy from the storage capacitor to the DC bus capacitor; and
wherein the control circuit further includes a current control circuit to selectively enable the first switching control signal or the second switching control signal according to a signal representing an absolute value of an inductor current flowing in the inductor to provide hysteretic control of the absolute value of the inductor current between a first value and a higher second value during transfer of ripple energy between the DC bus capacitor and the storage capacitor.

2. The ripple filter circuit of claim 1, wherein the control circuit includes a voltage control circuit including a filter circuit to filter a first signal representing the DC bus voltage to provide a second signal representing a ripple voltage of the DC bus circuit, the voltage control circuit further including a driver circuit to selectively enable one of the first and second switching control signals in response to the second signal exceeding a first threshold, and to selectively enable the other of the first and second switching control signals in response to the second signal falling below a second threshold to regulate a ripple voltage of the DC bus circuit.

3. The ripple filter circuit of claim 2, wherein the voltage control circuit controls the ripple voltage of the DC bus circuit by selectively providing the first and second switching control signals to selectively transfer ripple energy from the DC bus capacitor to the storage capacitor in response to the DC bus voltage exceeding an upper threshold and to selectively transfer ripple energy from the storage capacitor to the DC bus capacitor in response to the DC bus voltage falling below a lower threshold.

4. The ripple filter circuit of claim 2, wherein the voltage control circuit controls the ripple voltage of the DC bus circuit by selectively providing the first and second switching control signals to selectively transfer ripple energy from the DC bus capacitor to the storage capacitor in response to the DC bus voltage exceeding an upper threshold and to selectively transfer ripple energy from the storage capacitor to the DC bus capacitor in response to the DC bus voltage falling below a lower threshold.

5. The ripple filter circuit of claim 1, wherein the control circuit controls the ripple voltage of the DC bus circuit by selectively providing the first and second switching control signals to selectively transfer ripple energy from the DC bus capacitor to the storage capacitor in response to the DC bus voltage exceeding an upper threshold and to selectively transfer ripple energy from the storage capacitor to the DC bus capacitor in response to the DC bus voltage falling below a lower threshold.

6. The ripple filter circuit of claim 1, wherein the control circuit controls the ripple voltage of the DC bus circuit by selectively providing the first and second switching control signals to selectively transfer ripple energy from the DC bus capacitor to the storage capacitor in response to the DC bus voltage exceeding an upper threshold and to selectively transfer ripple energy from the storage capacitor to the DC bus capacitor in response to the DC bus voltage falling below a lower threshold.

7. A switching power converter, comprising:
a DC bus circuit, including:
a first DC bus node,
a second DC bus node, and
a DC bus capacitor connected between the first and second DC bus nodes;
a switching circuit including a plurality of switching devices to interface the DC bus circuit with an AC load or an AC source; and
a ripple filter circuit to store ripple energy from the DC bus circuit to regulate a ripple voltage of the DC bus circuit, the ripple filter circuit including:
a first switch connected between the first DC bus node and a switching node,
a second switch connected between the switching node and the second DC bus node,
an inductor connected between the switching node and a second node,
a storage capacitor connected between the second node and one of the first and second DC bus nodes,
a first diode including an anode connected to the second node and a cathode connected to the first DC bus node,
a second diode including an anode connected to the second DC bus node and a cathode connected to the second node, and
a control circuit coupled to control the first and second switches to selectively transfer ripple energy from the DC bus capacitor to the storage capacitor and then transfer ripple energy from the storage capacitor to the DC bus capacitor to regulate a ripple voltage of the DC bus circuit, wherein the control circuit further includes a current control circuit to selectively enable operation of the first and second switches according to a signal representing an absolute value of an inductor current flowing in the inductor to provide hysteretic control of the absolute value of the inductor current between a first value and a higher second value during transfer of ripple energy between the DC bus capacitor and the storage capacitor.

8. The switching power converter of claim 7, wherein the DC bus capacitor is non-electrolytic.

9. The switching power converter of claim 7, wherein the switching circuit is a switching inverter to convert power from the DC bus circuit to drive an AC load.

10. The switching power converter of claim 7, wherein the control circuit includes a voltage control circuit including a filter circuit to filter a first signal representing the DC bus voltage to provide a second signal representing a ripple voltage of the DC bus circuit, the voltage control circuit further including a driver circuit to selectively operate one of the first and second switches in response to the second signal exceeding a first threshold, and to selectively operate the other of the first and second switches in response to the second signal falling below a second threshold to regulate the ripple voltage of the DC bus circuit.

11. The switching power converter of claim 10, wherein the voltage control circuit controls the ripple voltage of the DC bus circuit by controlling operation of the first and second switches to selectively transfer ripple energy from the DC bus capacitor to the storage capacitor in response to the DC bus voltage exceeding an upper threshold and to selectively transfer ripple energy from the storage capacitor to the DC bus capacitor in response to the DC bus voltage falling below a lower threshold.

12. The switching power converter of claim 10, wherein the voltage control circuit controls the ripple voltage of the DC bus circuit by controlling operation of the first and second switches to selectively transfer ripple energy from the DC bus capacitor to the storage capacitor in response to the DC bus voltage exceeding an upper threshold and to selectively transfer ripple energy from the storage capacitor to the DC bus capacitor in response to the DC bus voltage falling below a lower threshold.

13. The switching power converter of claim 7, wherein the control circuit controls the ripple voltage of the DC bus circuit by controlling operation of the first and second switches to selectively transfer ripple energy from the DC bus capacitor to the storage capacitor in response to the DC bus voltage exceeding an upper threshold and to selectively transfer ripple energy from the storage capacitor to the DC bus capacitor in response to the DC bus voltage falling below a lower threshold.

14. The switching power converter of claim 7, wherein the control circuit controls the ripple voltage of the DC bus circuit by providing the first and second switching control signals to selectively transfer ripple energy from the DC bus capacitor to the storage capacitor in response to the DC bus voltage exceeding an upper threshold and to selectively transfer ripple energy from the storage capacitor to the DC bus capacitor in response to the DC bus voltage falling below a lower threshold.

15. A method to control ripple voltage in a DC bus circuit of a switching power converter, the method comprising:
connecting first and second switches in series with one another between first and second DC bus nodes of the DC bus circuit;
connecting a first terminal of an inductor to a switching node joining the first and second switches;
connecting a storage capacitor between a second terminal of the inductor and one of the first and second DC bus nodes;
controlling the first and second switches to alternately transfer ripple energy from a DC bus capacitor of the DC bus circuit through the inductor to the storage capacitor, and then transfer ripple energy from the storage capacitor through the inductor to the DC bus capacitor to regulate the ripple voltage of the DC bus circuit;
selectively enabling operation of the first and second switches according to a signal representing an absolute value of an inductor current flowing in the inductor to provide hysteretic control of the absolute value of the inductor current between a first value and a higher second value during transfer of ripple energy between the DC bus capacitor and the storage capacitor; and
filtering a first signal representing a DC bus voltage of the DC bus circuit to provide a second signal representing a ripple voltage of the DC bus circuit; and
selectively operating one of the first and second switches in response to the second signal exceeding a first threshold, and selectively operating the other of the first and second switches in response to the second signal falling below a second threshold to regulate the ripple voltage of the DC bus circuit.

\* \* \* \* \*